United States Patent [19]
Martyn et al.

[11] 3,833,399
[45] Sept. 3, 1974

[54] SURFACE TREATMENT OF FLUORESCENT LAMP BULBS AND OTHER GLASS OBJECTS

[75] Inventors: William C. Martyn, Lyndhurst; Ronald J. Olwert, Willoughby, both of Ohio

[73] Assignee: General Electric Company, Schenectady, N.Y.

[22] Filed: July 17, 1972

[21] Appl. No.: 272,489

[52] U.S. Cl. ......... 117/33.5 L, 117/33.5 R, 117/69, 117/95, 117/123 B, 65/30, 313/109, 313/221
[51] Int. Cl. .......................... H01j 1/62, H01j 63/04
[58] Field of Search ............ 117/33.5 L, 33.5 R, 95, 117/69, 123 B; 65/30; 313/221, 109

[56] References Cited
UNITED STATES PATENTS

| | | | |
|---|---|---|---|
| 2,418,202 | 4/1947 | Stanworth | 117/33.5 L |
| 2,533,809 | 12/1950 | Hushley et al. | 250/164 |
| 2,586,304 | 2/1952 | Coltman | 250/80 |
| 2,607,014 | 8/1952 | Roy et al. | 313/109 |
| 2,706,691 | 4/1955 | Schaefer | 117/33.5 L |
| 3,067,356 | 12/1962 | Ray | 313/221 |
| 3,102,049 | 8/1963 | Quick | 117/94 |
| 3,141,990 | 7/1964 | Ray | 313/221 |
| 3,377,494 | 4/1968 | Repsher | 117/33.5 L |
| 3,379,917 | 4/1968 | Menelly | 313/109 |
| 3,541,376 | 11/1970 | Sadoski et al. | 117/33.5 L |
| 3,599,029 | 8/1971 | Martyny | 313/109 |

*Primary Examiner*—William D. Martin
*Assistant Examiner*—William R. Trenor
*Attorney, Agent, or Firm*—Norman C. Fulmer; Henry P. Truesdell; Frank L. Neuhauser

[57] ABSTRACT

A solution of aluminum-s-butoxide combined with either or both of tetrabutyl titanate and tributyl antimony is applied to the surface of a glass lamp bulb or other glass object, and heated to about 400°C or higher. Such treatment on the exterior of a bulb hardens and strengthens the glass surface. When the treatment is applied to the interior of a bulb, the treated surface acts as a barrier to alkali materials in the glass, and also hardens and strengthens the bulb. Preferably, a sufficient amount of the aluminum-s-butoxide is used so that the reaction produces some aluminum oxide which functions as a getter for water vapor and oxygen in the bulb.

11 Claims, 2 Drawing Figures

PATENTED SEP 3 1974

3,833,399

SURFACE TREATMENT OF FLUORESCENT LAMP BULBS AND OTHER GLASS OBJECTS

CROSS-REFERENCE TO RELATED APPLICATION

Ser. No. 211,779, filed Dec. 23, 1971, now U.S. Pat. No. 3,775,161, in the names of William C. Martyny and Ronald J. Olwert, and assigned to the same assignee as the present patent application.

BACKGROUND OF THE INVENTION

The invention is in the field of coating and surface-treating glass, particularly the interior and/or exterior surfaces of glass bulbs for lamps and other electrical devices.

Numerous materials have been proposed and/or used as coatings on glass objects such as glass bulbs, for achieving improved characteristics or performance of the lamps or other devices for which the bulbs are used. Elongated fluorescent lamp bulbs have been given considerable attention in the way of protective coatings, both on the exterior and on the interior of the bulb. The above-referenced patent application is directed to an external protective coating of titanium dioxide and magnesium fluoride, which may be applied in the form of tetrabutyl titanate and magnesium fluoride, and which imparts lubricity to the bulb for improving its handling characteristics by automatic machinery. U.S. Pat. No. 3,599,029 to Martyny, issued Aug. 10, 1971 and assigned the same as the present patent application, is directed to internal bulb coatings of titanium dioxide and aluminum oxide, which can be applied in the form of a mixture of tetrabutyl titanate and aluminum oxide in a suitable thinner and binder. Other materials and additives that have heretofore been proposed for bulb coatings include silicone, phosphate, and oxides of chromium, zinc, silicon, zirconium, magnesium, barium, lead, and antimony.

SUMMARY OF THE INVENTION

Objects of the invention are to provide an improved method of treating the surfaces of glass, particularly glass bulbs for lamps and other electrical devices, and to provide a method for easily and simultaneously treating the exterior and interior surfaces of bulbs to achieve improved characteristics and performance.

The invention comprises, briefly and in a preferred embodiment, the steps of applying a mixture or solution of aluminum-s-butoxide [$Al(OC_4H_9)_3$] combined with either tetrabutyl titanate [$Ti(OC_4H_9)_4$] or tributyl antimony [$Sb(C_4H_9)_3$], to the surface of a glass bulb, and heating the bulb and applied solution to a temperature of at least 400°C. If desired, both tetrabutyl titanate and tributyl antimony can be included in the solution. By this method, the solution does not form a coating on the glass, but instead reacts with the glass to achieve desirable surface characteristics. Such treatment on the exterior of the bulb hardens and strengthens the surface. When the treatment is applied to the interior of a bulb, the treated surface acts as a barrier to alkali materials in the glass which would otherwise have a deleterious reaction with mercury in a mercury-vapor lamp, and also hardens and strengthens the bulb. Preferably a sufficient amount of the aluminum-s-butoxide is used so that the reaction produces some aluminum oxide which functions as a getter for water vapor and oxygen in the bulb. Also, preferably, the above-described solution of materials is mixed with an ethyl cellulose binder to prevent hydrolysis of the materials prior to the step of heating and causing the reaction of the materials with the glass. Butanol and a thinner can also be added to the solution, for improved results in certain applications. In addition to the advantages already mentioned, the method of the invention, when applied to a mercury-vapor fluorescent lamp, results in transmission of the desired visible portion of light through the bulb with no loss of brightness, while at the same time the bulb is opaque to a large portion of the ultraviolet light produced by the mercury-vapor discharge.

DESCRIPTION OF THE PREFERRED EMBODIMENTS

Figure 1:
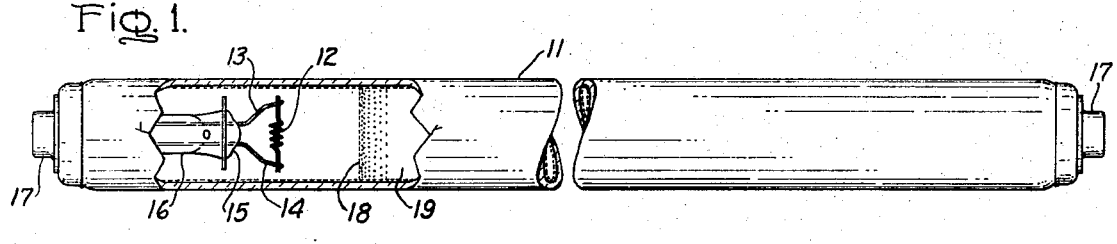
FIG. 1 is a side view of a fluorescent mercury-vapor lamp made in accordance with a preferred embodiment of the invention, a portion thereof being broken away to show interior details.

The lamp shown in FIGS. 1 and 2 may be of conventional construction except for the method of treating the surface of the glass envelope in accordance with the invention, as will be described subsequently. The lamp comprises a sealed envelope 11 of elongated tubular shape, and may be made of conventional soda-lime silica glass. It is provided with the usual filament and/or anode electrode 12 at each end, supported on inlead wires 13, 14 which extend through a glass press 15 in a mount stem 16, to contacts of a base 17. The lamp envelope is filled with an inert gas such as argon or a mixture of argon and neon at a low pressure, for example, 2 millimeters, and a small amount of mercury, at least enough to provide a pressure of about 6 microns during operation of the lamp. The darkened region 18 in FIG. 1 represents the darkening which develops in fluorescent lamps forwardly of the cathodes, unless steps are taken to prevent it from occurring. It is generally referred to as oxide ring and consists of mercury compounds. As will be more fully explained, the glass bulb treatment in accordance with the invention prevents the development of this oxide ring. Numeral 19 represents the phosphor coating inside the bulb 11, which, for example, may consist of calcium halophosphate activated with antimony and manganese, or it may consist of any other suitable fluorescent lamp phosphor material.

Prior to sealing the mount stems 16 into the bulb, and prior to applying the phosphor 19 to the bulb, the bulb itself, in accordance with the invention, is treated as follows. A solution is prepared, containing aluminum-s-butoxide combined with either or both of tetra-butyl titanate and tributyl antimony. This solution is applied to the exterior surface or the interior surface of the bulb 11, or to both, simultaneously, by suitable means such as spraying, or pouring it onto the bulb, or immersing the bulb into the solution. The bulb, with the solution on its surface, is then heated by suitable means such as a furnace, to a temperature of at least 400°C momentarily or for a few seconds, to cause the occurrence of a chemical type of reaction of the solution with the surface or surfaces of the bulb. A temperature of about 600°C is preferred. While the exact nature of this reaction is not fully understood, it is believed that titanium and aluminum ions from the aforesaid solution enter into the surface region of the hot glass. This effects a change in the surface characteristics of the glass bulb, thus producing the desirable characteristics mentioned above in the glass itself, instead of the more conventional prior art method of providing a distinct coating or layer of protective material over the glass surface. In a mercury-vapor lamp, the inner treated glass surface 22 acts as a barrier for preventing alkali materials in the glass from reacting with mercury, which would form the oxide ring 18.

In applying the invention to a fluorescent lamp, it is advantageous to apply the above-mentioned solution to one or both surfaces of the bulb as described above, and permit the solution to dry, either at room temperature or by blowing warm air over the bulb. Then, the phosphor coating 19 is applied over and within the inner coating of the solution inside the bulb 11, whereupon the bulb is heated as described above to cause a reaction of the protective coating with the glass surface, while at the same time performing the required heating or lehring of the phosphor coating. In FIG. 2, numeral 21 represents the exterior surface region treatment of the bulb 11, and the numeral 22 represents the treated interior surface of the bulb, in accordance with the invention.

Figure 2:
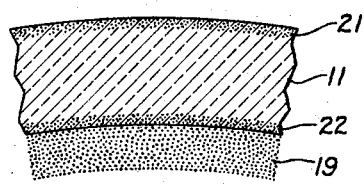
FIG. 2 is a partial cross-section, expanded in scale, through the middle portion of the lamp of FIG. 1.

In carrying out the above-described method, preferably a sufficient or excess amount of the aluminum-$s$-butoxide is used in the solution, at least in the solution used for treating the inner wall indicated by numeral 22 in FIG. 2, so that when the treatment is complete there will be some aluminum oxide present at the inner surface of the glass bulb, which will act as a getter for water vapor and oxygen in the completed lamp.

Since the above-mentioned basic constituents of the solution employed in treating the bulb surface tend to hydrolyze when exposed to air, when mixing these ingredients together it is found desirable to also mix with them an ethyl cellulose binder which will protect the materials from hydrolysis until they are heated to the above-mentioned temperature of 400°C or higher in causing their chemical reaction with the glass surface. It has been found that the ethyl cellulose binder mixed in with the coating solution, will keep the materials in solution form and protected from hydrolysis even after the solution has been coated on the bulb and dried.

A complete and preferred formula for the glasstreating solution, particularly suitable for treating the interior surface of a bulb to which a fluorescent powder or phosphor is to be applied, and also suitable for coating and treating the exterior bulb surface, is as follows:

½ ml tributyl antimony [$Sb(C_4H_9)_3$]
5 ml tetrabutyl titanate [$Ti(OC_4H_9)_4$]
10 ml aluminum-$s$-butoxide [$Al(OC_4H_9)_3$]
125 ml thinner (50 percent naphtha 50 percent butyl acetate)
125 ml butanol
40 ml ethyl cellulose binder.

In the above formulation, the relative amounts of tributyl antimony and tetrabutyl titanate can be changed, or only one of them need be used. With the formulation containing approximately twice the amount of aluminum-$s$-butoxide as that of the other main ingredient or ingredients, the above-described aluminum oxide will be produced when the solution is baked, for functioning as a getter of oxygen (and also water vapor) in the bulb. The purpose of the thinner in the formula is to take into solution the ethyl cellulose and the organometallic materials, i.e., the tetrabutyl titanate and the aluminum-$s$-butoxide and the tributyl antimony. The purpose of the butanol in the formula is to slow the evaporation rate of the solution when applied to the bulb, and to suitably accept a water binder phosphor coating. As explained above, the solution may be applied to both of the inner and outer surfaces of the bulb, dried, and then a liquid phosphor suspension can be coated into the bulb, dried, and the solution and phosphor can then be baked simultaneously.

The method of the invention is useful with many types of glass, including hard glass, for achieving the objectives of hardening and strengthening the glass surface, and also for acting as a barrier of harmful ingredients in the glass (particularly the alkali in soda-lime glass conventionally used for fluorescent lamp bulbs). The invention also achieves the desired objective of a clear and transparent treated glass surface having 100 percent light transmission.

While preferred embodiments of the invention, and modifications thereof, have been shown and described, other embodiments and modifications thereof will become apparent to persons skilled in the art, and will fall within the scope of invention as defined in the following claims.

What we claim as new and desire to secure by Letters Patent of the United States is:

1. A method of treating glass, comprising the steps of applying to the glass surface a mixture of aluminum-$s$-butoxide and a material selected from the group consisting of tetrabutyl titanate and tributyl antimony and a mixture thereof and heating said glass and mixture to a temperature of at least 400°c., the amount of aluminum-s-butoxide in said mixture being sufficient to cause aluminum oxide to be produced during said step of heating.

2. A method as claimed in claim 1, in which said temperature is approximately 600°C.

3. A method as claimed in claim 1, in which the amount of aluminum-s-butoxide in said mixture is approximately twice that of said other materials in the mixture.

4. A method as claimed in claim 1, in which an ethyl cellulose binder is combined with said mixture to prevent hydrolysis of the mixture materials prior to said step of heating.

5. A method of treating a glass bulb for an electrical device, comprising the steps of applying to at least one of the inner and outer surfaces of the bulb a mixture of aluminum-s-butoxide and a material selected from the group consisting of tetrabutyl titanate and tributyl antimony and a mixture thereof, and heating said bulb and mixture to a temperature of at least 400°C the amount of aluminum-$s$-butoxide in said mixture being sufficient to cause aluminum oxide to be produced during said step of heating.

6. A method as claimed in claim 5, in which said temperature is approximately 600°C.

7. A method as claimed in claim 5, in which said amount of aluminum-$s$-butoxide is approximately twice that of said other materials in the mixture.

8. A method as claimed in claim 5, in which an ethyl cellulose binder is combined with said mixture to prevent hydrolysis of the mixture materials prior to said step of heating.

9. A method as claimed in claim 5, in which said bulb is a fluorescent lamp bulb, and including the step of applying a phosphor coating inside said bulb after applying said mixture to the inside of the bulb and prior to said heating, whereby said heating causes a chemical reaction to said mixture with the glass bulb and also lehrs the phosphor.

10. A method as claimed in claim 9, in which butanol is combined with said mixture to facilitate the adherence of said phosphor.

11. A method as claimed in claim 9, in which an ethyl cellulose binder is combined with said mixture to prevent hydrolysis of the mixture materials prior to said step of heating.

* * * * *